United States Patent

Frey et al.

[11] Patent Number: 5,917,296
[45] Date of Patent: Jun. 29, 1999

[54] OPTIMUM MOTOR SPEED CONTROL SYSTEM

[75] Inventors: Mark Frey, Mason; Karen M. Pirrallo, Dayton; Saed M. Mubaslat, Miamisburg; Kevin A. Wolff, Dayton, all of Ohio

[73] Assignee: Valeo Electrical Systems, Inc., Auburn Hills, Mich.

[21] Appl. No.: 08/976,281

[22] Filed: Nov. 21, 1997

[51] Int. Cl.$^6$ ....................................................... H02P 5/17
[52] U.S. Cl. ........................ 318/268; 318/257; 318/432; 388/811; 388/819
[58] Field of Search ........................... 318/626, 256–272, 318/275, 432, 433; 388/809, 811, 816, 819

[56] References Cited

U.S. PATENT DOCUMENTS

| | | | |
|---|---|---|---|
| 4,614,903 | 9/1986 | Betsch et al. | 318/443 |
| 4,775,823 | 10/1988 | Yoshida et al. | 318/266 |
| 5,151,637 | 9/1992 | Takada et al. | 318/376 |
| 5,568,031 | 10/1996 | Jinbo et al. | 318/630 |
| 5,627,440 | 5/1997 | Yamamoto et al. | 318/568.21 |

*Primary Examiner*—Bentsu Ro
*Attorney, Agent, or Firm*—J. Gordon Lewis

[57] ABSTRACT

The method for controlling a motor driving a load holds the speed of the output shaft of the motor substantially constant as the torque imposed upon the shaft by the load varies, then regulates the rate of change of the output torque delivered by the motor's output shaft as the motor's speed decreases.

4 Claims, 5 Drawing Sheets

OPTIMUM MOTOR SPEED CONTROL SYSTEM

FIELD OF THE INVENTION

The invention relates to a method and a system for controlling the speed of a motor's output shaft as the torque or force imposed upon the shaft by the load being driven by the motor varies, and for controlling the output torque delivered by the shaft as the motor's speed drops to zero. This invention can be used to control an electric motor in a powered system of a motor vehicle.

BACKGROUND OF THE INVENTION

Many powered systems in motorized vehicles are controlled by permanent magnet electric motors. Examples include window lifts, sunroofs, sliding van doors, vehicle trunks, tailgates, and seat and seat back recliners and adjusters. The variability of certain parameters in many powered systems (e.g., the supply voltage, operating temperature, and the load driven by the motor) produces a variable speed vs. torque performance characteristic in the permanent magnetic electric motor used to power such a system, leading to undesirable variation in the powered systems' travel time, noise level, and sealing force. A control method and system is needed for optimizing the speed vs. torque performance characteristic of motors that drive powered systems in motor vehicles notwithstanding the variability of operating parameters in these systems.

SUMMARY OF THE INVENTION

The inventive method for controlling a motor driving a load is comprised of two phases. In the first phase, the speed of the motor's output shaft is held substantially constant as the torque imposed upon the output shaft by the load, and, therefore, the output torque of the motor, varies. In the second phase, the torque delivered by the motor's output shaft is controlled in a predetermined manner as the speed of the output shaft drops to zero.

The inventive method may be applied in an automotive or motor vehicle setting to any motor that drives a traveling component in a powered system. In the first phase of the inventive method, a traveling component is driven by the motor at a constant speed to some intermediate position. During this first phase, the output speed of the motor is held constant regardless of variations in operating environment parameters. In a second phase as the traveling component moves from the intermediate position to a second position, the output speed of the motor is continuously decreased and the output torque delivered by the motor's output shaft is controlled.

DETAILED DESCRIPTION OF THE PREFERRED EMBODIMENT

Figure 1:
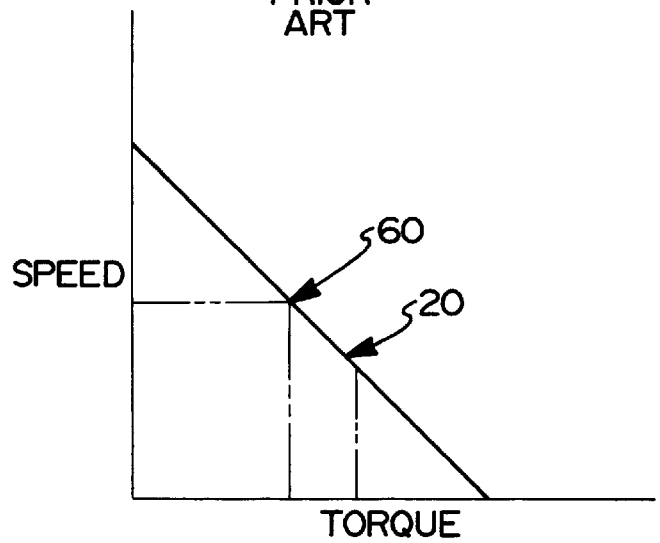
FIG. 1 is a graph depicting the uncontrolled speed vs. load and output torque performance curve of a permanent magnet electric motor.

Referring now to the drawings in which each numeral represents the same component among the several views, FIG. 1 depicts the speed vs. torque performance curve 20 of a typical permanent magnet electric motor with open loop control, i.e., with no control. The revolutions per minute or speed of the motor's output shaft is shown as a function of the input torque imposed on the motor's output shaft by the load driven by the motor. As the load torque increases the motor's speed decreases linearly. Variations in the input torque arise as a result of variations in certain operating parameters, for example, variability in the load imposed on the motor, in the operating temperature of the motor, and in the voltage supplied to the motor. As a result this variability, using open loop control for the permanent magnet motor in a powered system of an automobile disadvantageously leads to variation in the powered system's travel time, noise level, and sealing force.

Figure 2:
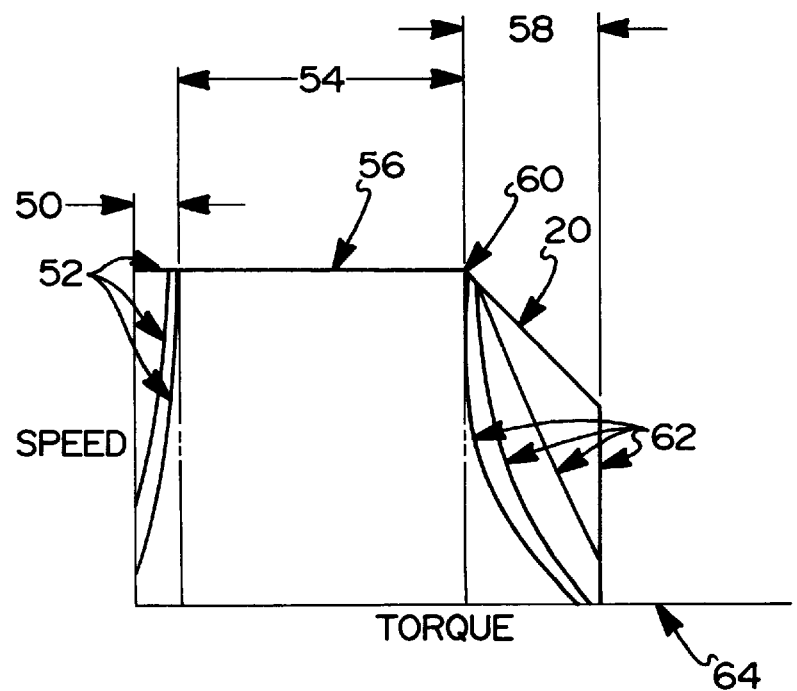
FIG. 2 is a graph depicting the speed vs. output torque performance curve of a motor controlled according to the present invention.

Because FIG. 1 represents open loop control of the motor, the same curve may also be used to show the revolutions per minute or speed of the motor's output shaft as a function of the torque delivered by the output shaft of a motor to drive the load. The speed vs. output torque performance characteristic for the motor of FIG. 1 operating under closed loop control according to the present method is shown in FIG. 2.

The multiple curves 52 in region 50 depict various paths for controlling the large increase in the motor's output speed as the motor is started and begins to develop output torque. Controlling the motor's speed in region 50 reduces the impact load on the components in the powered system' that are being actuated by the motor and on the mechanical components of the motor itself as the tolerances in the motor and in the powered system's mechanisms are taken up at startup.

The segment of the operating curve 56 in region 54 reflects a control scheme in which the motor's output speed is held constant at a medium value within its open loop operating range as the load torque and, therefore, the output torque required to drive the load, increases. This uniformity in speed promotes constant travel times, smooth performance of the powered system's sealing components, and reduces undesirable system noise variations.

The multiple curves 60 and 62 in region 58 depict various paths for controlling the decrease in the motor's output speed as the motor's output torque is increased at the end of the travel of the traveling component in the powered system. Control curve 60 corresponds to the uncontrolled open loop performance characteristic of curve 20 in FIG. 1. The closed-loop control method of the present invention represented by control curves 62 effects a soft stop for the traveling component as the motor's output speed drops to zero. Such a control scheme minimizes impact loads on the powered system's closure mechanism as it reaches the end of its travel and on the mechanical components of the motor itself.

At the end of the travel control curve 62 for the traveling component, the control method of the present invention applies a constant stall torque 64. The stall torque 64 holds the amount of force applied to the powered system's mechanism through the motor to a known value regardless of variations in the operating environment parameters.

Figure 3:
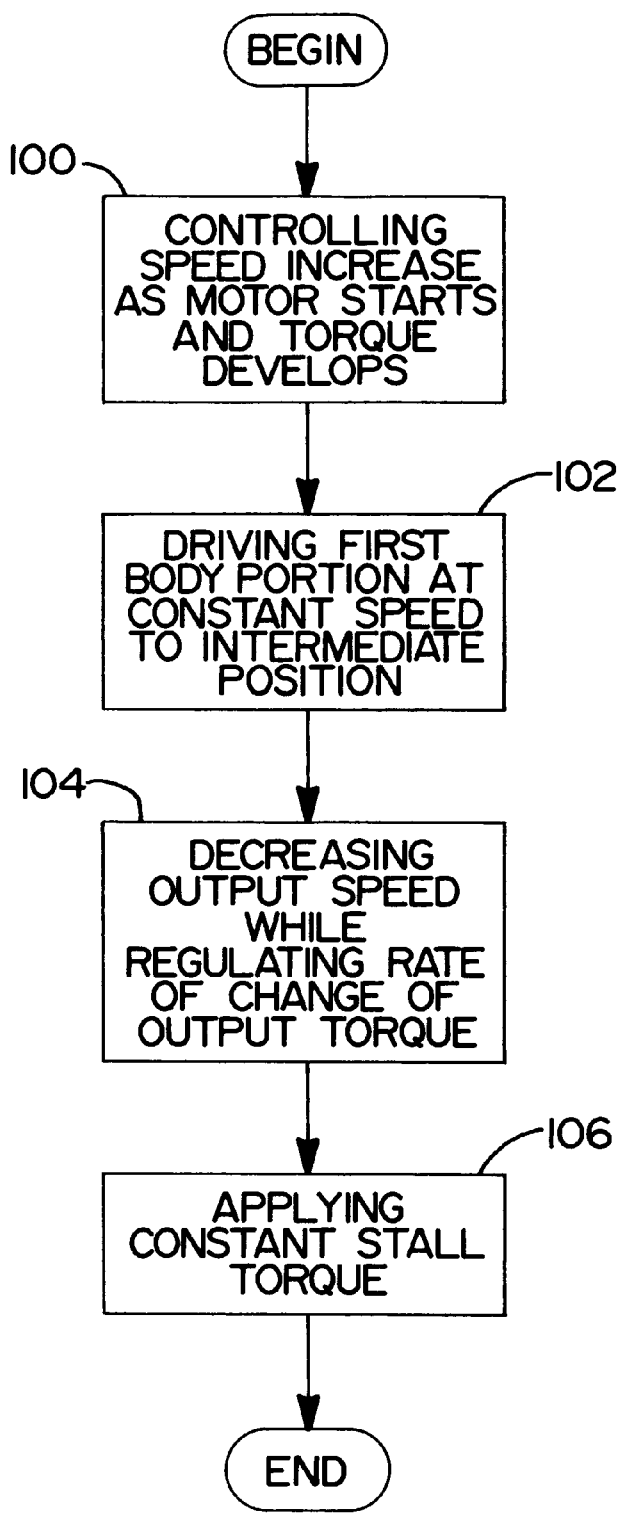
FIG. 3 is a flow chart outlining the motor control method of the present invention.

FIG. 3 outlines the control method of the present invention depicted in FIG. 2. In step 100, the output speed of the motor is controlled along one of the control paths 52 in region 50 as the motor is started and begins to develop torque. In step 102, the motor's output speed is held constant along curve 56 throughout the region 54 regardless of any increase in the motor's torque under the load up to point 60 as the motor drives the traveling component in the powered system at a constant speed to an intermediate position near the end of its predetermined travel path.

In step 104, the motor's speed is decreased along curve 62 in region 58 as the traveling component moves from its intermediate position to its final position on the travel path. The speed is decreased along path 62 as the rate of change of the output torque is regulated and minimized throughout region 58 as the traveling component nears the end of its travel path. At point 64 a constant-valued stall torque is applied at a position very near the end of the powered system's travel to effect a soft positive stop for the traveling and/or sealing components of the powered system.

The control method outlined in FIG. 3 advantageously eliminates variations in closure time between multiple powered systems of the same vehicle. For example, if all windows in a vehicle are in the fully open position and are commanded to close at the same time, the method of FIG. 3 ensures that they will close simultaneously, thus improving sound quality in the vehicle by reducing variation between the moving systems. Reducing motor speed 62 in region 58 as the powered system approaches the end of its travel and seating the sealing components with a constant stall torque 64 limits impact forces on the powered system and on the motor itself. In addition, powered systems may be optimized for a narrower range of forces, which reduces design and system costs.

Figure 4:
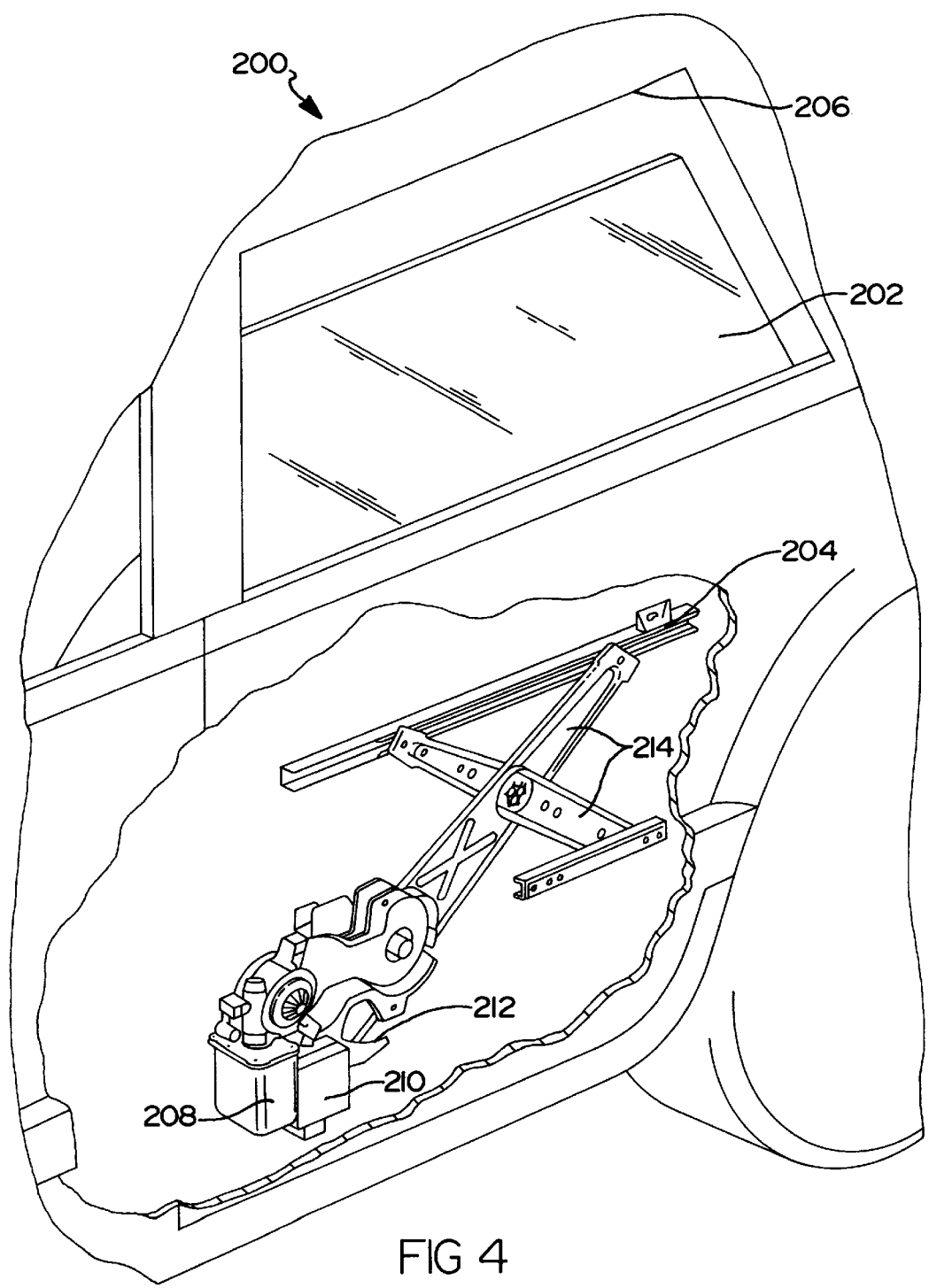
FIG. 4 is a perspective view of one of many applications of the present motor control method, a powered window lift system in an automotive vehicle.
Figure 5:
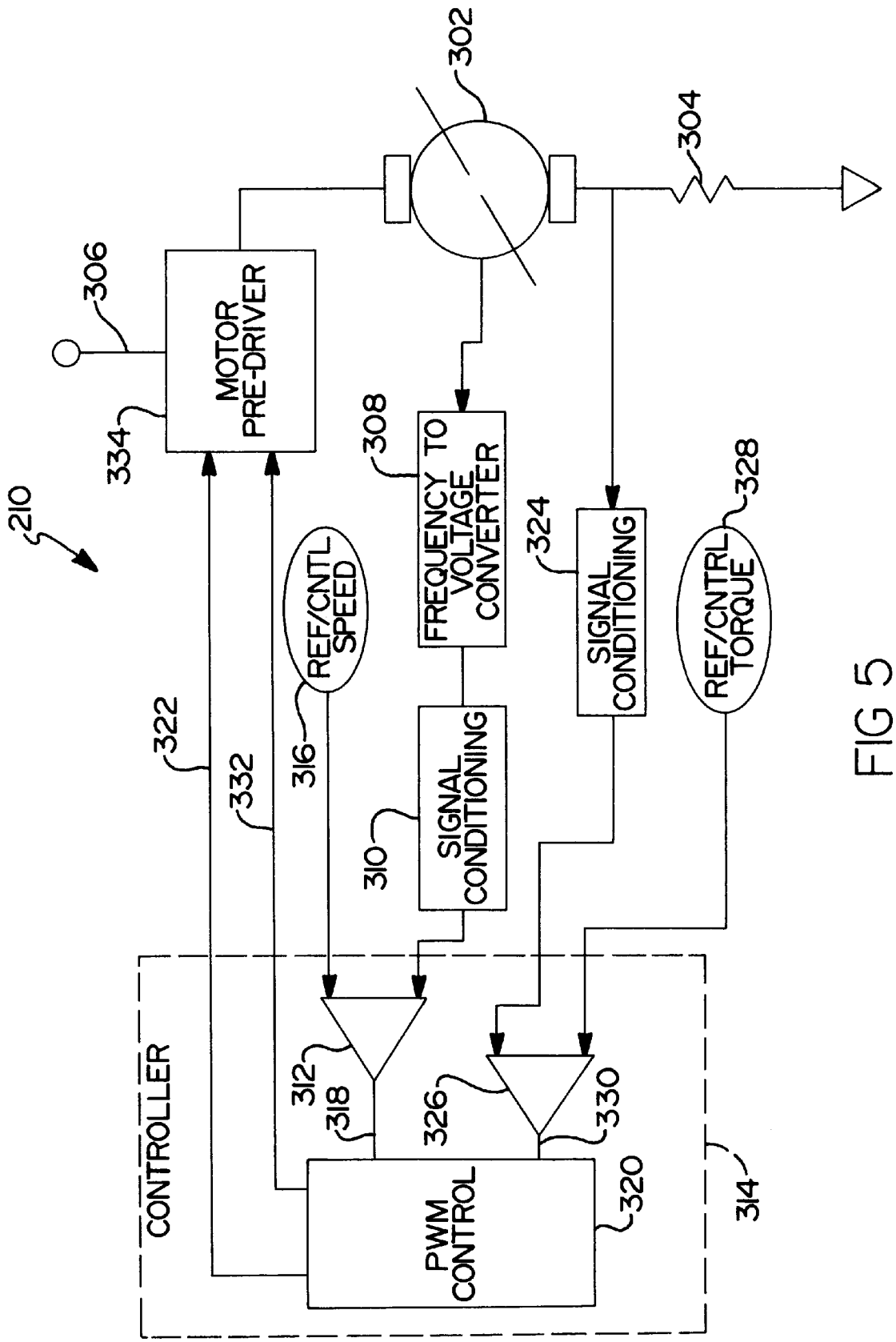
FIG. 5 is a functional block diagram depicting one of many analog electronic configurations of the motor controller for the window lift system of FIG. 4.
Figure 6:
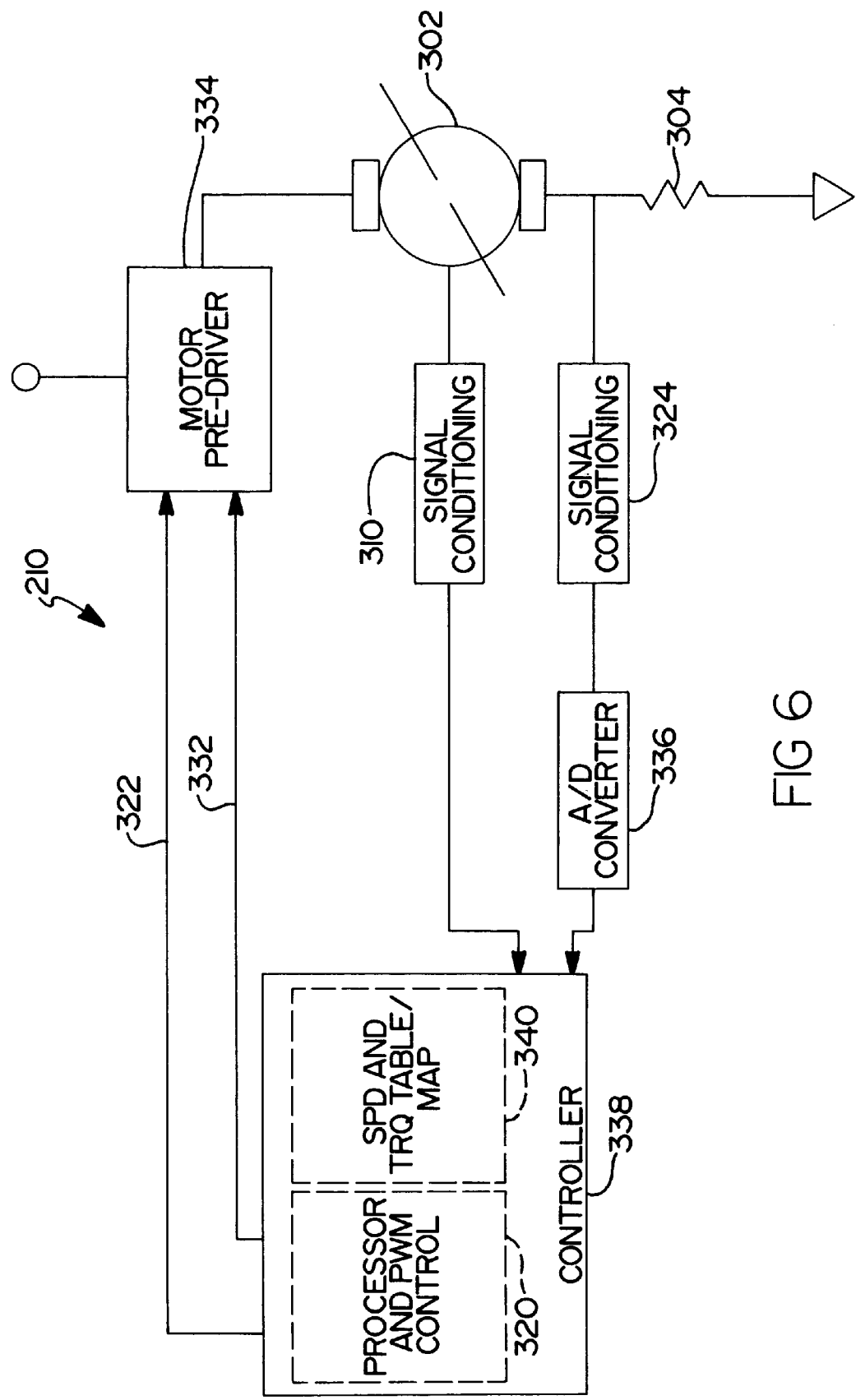
FIG. 6 is a functional block diagram depicting one of many digital electronic configurations of the motor controller for the window lift system of FIG. 4.

FIGS. 4, 5 and 6 illustrate the motor control method of the present invention applied to a powered window lift system 200 in an automotive vehicle. Referring now to FIG. 4, the powered lift system 200 includes a window 202 attached to a sash 204 that travels upward to seat the window 202 against a seal 206. A permanent magnet electric motor 208 controlled by electronics 210 operates a gear sector 212 that causes translation of regulator cross arms 214 attached to the sash 204. The extended and compressed positions of the regulator cross arms 214 define the open and closed positions of the window 202.

FIGS. 5 and 6 functionally depict two of the many possible motor controllers 210, which may be implemented physically using discrete hardware components or a combination of hardware and software with a microprocessor. In FIG. 5, a velocity sensor 302 provides digital data regarding the revolutions per minute or speed of the motor's 208 output shaft. A current sensor 304 positioned between the bus voltage 306 and ground provides analog data regarding the current flowing through the motor, from which the motor's output torque value is derived.

The digital output from the velocity sensor 302 is converted to the frequency domain 308 and conditioned 310 to improve its signal quality then compared 312 within the controller 314 to an external adjustable and programmable reference control speed value 316. Developing a reference value may be accomplished by any of the implementations well known in the art. For example, a multi-turn potentiometer or a resistive network attached to the motor shaft may be used to vary the output voltage as a function of the rotor or "window" position. A programmed EPROM or an independent processor could also be used, as well as distributing sensors along the path of the window guides, or providing analog multi-segment piece-wise linear curves or wave synthesizers.

The digital result 318 of the comparison 312 is supplied to a processor and pulsewidth modulation (PWM) control module 320 to determine the duty cycle of the motor control signal that will yield the performance curve of FIG. 2. This motor control signal is transmitted by the controller 314 via the PWM speed control bus 322 to a motor pre-driver that regulates the speed of the motor. The controller 314 may also be implemented logically using discrete component circuits.

In a similar fashion, output from the current sensor 304 is conditioned 324 to improve its signal quality then compared 326 to an external adjustable and programmable reference or control torque value 328. The digital result 330 is supplied to the PWM control module 320 to determine the duty cycle of the motor control signal that will yield the performance curve of FIG. 2. This motor control signal is transmitted by the controller 314 via the PWM torque control bus 332 to the motor pre-driver 334 that also regulates the output torque of the motor.

FIG. 6 depicts a one of the many alternate implementations of the motor controller 210. The analog output from the current sensor 304 is conditioned the converted from the analog to the digital domain 336 then, together with the conditioned digital output from the velocity sensor 302, compared within controller 338 against a programmed speed table or map 340 that charts the desired speed to implement the performance curve of FIG. 2. As in FIG. 5, a compare algorithm within processor and PMW control module 320 determines the duty cycle for the motor control signals required to control the motor in such a way as to yield the performance curve of FIG. 2. For example, the duty cycle may be increased if the motor speed falls below the desired speed, or decreased if the motor speed tends to exceed the desired speed at any point on the performance curve of FIG. 2.

A designer may choose the implementation of FIG. 5 or 6 depending on several factors such as complexity and calculation power of available processor and PWM modules 320, software memory requirements, bandwidth resolution of the PWM channels and the clarity of the motor control signals transmitted via control buses 322 and 332.

The present inventive method for controlling the speed of a motor has been illustrated in the context of only one of many possible applications, i.e., controlling a permanent magnet electric motor that drives a powered system in a motor vehicle. Alternative and minor variations of the invention that are apparent to those skilled in the art may still properly fall within the scope of the claims, which follow.

We claim:

1. A controller for controlling a motor driving a load, comprising:

speed sensor for sensing the revolutions per minute of the output shaft of said motor and for providing a sensed speed value;

current sensor for sensing current related to the torque output by said output shaft torque value and for providing a sensed output torque value;

reference speed means for providing a reference speed value;

reference torque means for providing a reference torque value;

processor with software control in communication with said speed sensor, said current sensor, said reference speed means, and said reference torque means, said processor for accepting said sensed speed value, said sensed output torque value, said reference speed value, and said reference torque value, and for providing a motor status signal for controlling the duty cycle of said motor.

2. A controller for controlling a motor driving a load, comprising:

a speed sensor for sensing the revolutions per minute of the output shaft of said motor and for providing a sensed speed value;

a current sensor for sensing current related to the torque output by said output shaft and for providing a sensed output torque value;

reference speed means for providing a reference speed value;

reference torque means for providing a reference torque value;

a speed comparator in communication with said speed sensor, and said reference speed means, said speed comparator for comparing the sensed speed value to said reference speed value, and for providing a speed status signal;

a torque comparator in communication with said current sensor, and said reference torque means, said torque comparator for comparing the sensed output torque value to the reference torque value, and providing a torque status signal;

processor with software control in communication with said speed comparator, and said torque comparator, said processor for accepting said speed status signal, and said torque status signal, and for providing a motor status signal for controlling the duty cycle of said motor.

3. An apparatus for controlling the movement of a first portion of a motor vehicle's body relative to a second portion of said body, comprising:

a motor for driving said first portion;

speed sensor for sensing the revolutions per minute of the output shaft of said motor and providing a sensed speed value;

current sensor for sensing current related to the torque output by said output shaft torque value and providing a sensed output torque value;

reference speed means for generating a reference speed value;

reference torque means for generating a reference torque value;

processor with software control in communication with said motor, said speed sensor, said current sensor, said reference speed means, and said reference torque means, said processor for accepting said sensed speed value, said sensed output torque value, said reference speed value, and said reference torque value, and for providing a motor status signal for controlling the duty cycle of said motor.

4. An apparatus for controlling the movement of a first portion of a motor vehicle's body relative to a second portion of said body, comprising:

a motor for driving said first portion;

a speed sensor for sensing the revolutions per minute of the output shaft of said motor and providing a sensed speed value;

a current sensor for sensing current data related to the torque output by said output shaft and providing a sensed output torque value;

reference speed means for generating a reference speed value;

reference torque means for generating a reference torque value;

a speed comparator in communication with said speed sensor and said reference speed means for comparing the sensed speed value to said reference speed value and providing a speed status signal;

a torque comparator in communication with said current sensor and said reference torque means for comparing the sensed output torque value to the reference torque value and providing a torque status signal;

processor with software control in communication with said motor, said speed comparator and said torque comparator for accepting said speed status signal and said torque status signal and providing a motor status signal for controlling the duty cycle of said motor.

* * * * *